United States Patent
Lin et al.

(10) Patent No.: US 6,906,435 B1
(45) Date of Patent: Jun. 14, 2005

(54) UNINTERRUPTIBLE POWER SYSTEM WITH TWO CURRENT CONVERSION UNITS

(75) Inventors: Hsin-An Lin, Taichung (TW); Kuo-Hsien Tsai, Taichung (TW)

(73) Assignee: Handsun Electronic Enterprise Co., Ltd., Taichung (TW)

( * ) Notice: Subject to any disclaimer, the term of this patent is extended or adjusted under 35 U.S.C. 154(b) by 8 days.

(21) Appl. No.: 10/725,032

(22) Filed: Dec. 2, 2003

(51) Int. Cl.[7] .................................................. H02J 7/00
(52) U.S. Cl. .......................................... 307/66; 307/64
(58) Field of Search ............................. 307/64, 66, 70, 307/71, 69, 65

(56) References Cited

U.S. PATENT DOCUMENTS

| | | | | |
|---|---|---|---|---|
| 4,642,475 A | * | 2/1987 | Fischer et al. ................ 307/66 |
| 5,446,645 A | * | 8/1995 | Shirahama et al. ........... 363/71 |
| 5,801,937 A | * | 9/1998 | Gold et al. .................. 363/141 |
| 6,121,695 A | * | 9/2000 | Loh .............................. 307/64 |
| 6,492,745 B1 | * | 12/2002 | Colley et al. ................. 307/66 |

* cited by examiner

Primary Examiner—Bao Q. Vu
(74) Attorney, Agent, or Firm—Rosenberg, Klein & Lee

(57) ABSTRACT

An uninterruptible power system has two current conversion units coupled between a line voltage and a load in parallel, wherein each current conversion unit has a rectifier and an inverter connected in series. The two rectifiers and inverters are further connected to form a cross configuration. At least one battery set is coupled to the output terminals of the two rectifiers, wherein a battery monitor controller is applied to monitor the battery information which is then transferred to a remote host. When either inverter or rectifier is faulty in one of said current conversion modules, the normal inverter or rectifier in the same module is still operated and controlled by the other current conversion module.

9 Claims, 6 Drawing Sheets

UNINTERRUPTIBLE POWER SYSTEM WITH TWO CURRENT CONVERSION UNITS

BACKGROUND OF THE INVENTION

1. Field of the Invention

The present invention relates to an uninterruptible power system (UPS), and more particularly to a power system with two current conversion units, such that when one unit fails the other one replaces the abnormal loop thus ensuring the stability of the power system.

2. Description of Related Art

With reference to FIG. 5, a conventional UPS with single current conversion module includes two power supply loops to provide an operating voltage to a load. The first power supply loop is composed of a first transformer (70), a current conversion module (71), a switching element (72) and an autotransformer (73).

A by-pass switch (74) is coupled between the output of the transformer (70) and the switching element (72). When the first power supply loop is interrupted, the by-pass switch (74) becomes conductive thus allowing the AC voltage supply to pass to the load directly.

The current conversion module (71) has a rectifier (711), an inverter (712), a battery set (75) and a battery monitoring controller (713), wherein the rectifier (711) is for converting the AC voltage to a DC voltage. In contrast with the rectifier (711), the inverter (712) converts the DC voltage to an AC voltage. The DC voltage output of the rectifier (711) is further applied to charge the battery set (75). Therefore, once the input AC voltage is unexpectedly interrupted, the battery set (75) still can provide an AC voltage to the load through the DC/AC conversion by the inverter (712).

The second power supply loop in the UPS system is formed by a second transformer (77) and another by-pass switching element (78), through which the input AC voltage can be by-passed to the load directly.

From the foregoing description, it is noted that there is only one current conversion module (71) applied in the UPS system. When the rectifier (711) or the inverter (712) has a breakdown, the UPS may experience possible loss of its function of supplying backup voltage. Although the load still derives the power supply through the second power supply loop from the input AC voltage, it may cause a great loss when the input AC voltage suddenly fails. Therefore, even the of single module UPS possesses the advantages of simple circuit design and low equipment cost, such a power system may encounter difficulties in trying satisfy the desired stability requirement.

With reference to FIG. 6, another kind of conventional UPS is provided with two current conversion modules (71)(71') coupled in parallel. In the normal status, both of the modules (71) are operated together to supply a voltage to the load. When the rectifier (711)(711') or the inverter (712)(712) in either module (71)(71') breaks down, that module will be completely shutdown and the other normal module will operate individually. In a condition that both modules (71)(71') fail, the by-pass switching element (74) turns to conductive so that the input AC voltage directly passes to the load.

There is no doubt that the stability of the UPS shown in FIG. 6 is superior to that of FIG. 5, however, the latter has high equipment cost. Another problem is that the utilization efficiency of the two modules (71)(71') is quite low. For example, if one current conversion module (71) is shut down, it is possible that only one element of the module (71) and the rest elements are still able to operate well. However, the suspension in operating of those normal elements would result in the decrease of the utilization efficiency. Therefore, it is desired to provide a novel power system to obviate the aforementioned drawback.

SUMMARY OF THE INVENTION

The main objective of the present invention is to provide an uninterruptible power system with two current conversion units, both of which are connected to form a cross configuration, wherein when failure occurs in any element in the one of the two units, the remaining elements in that abnormal unit are still workable and controlled by the normal unit.

Other objects, advantages and novel features of the invention will become more apparent from the following detailed description when taken in conjunction with the accompanying drawings.

DETAILED DESCRIPTION OF THE PREFERRED EMBODIMENT

Figure 1:
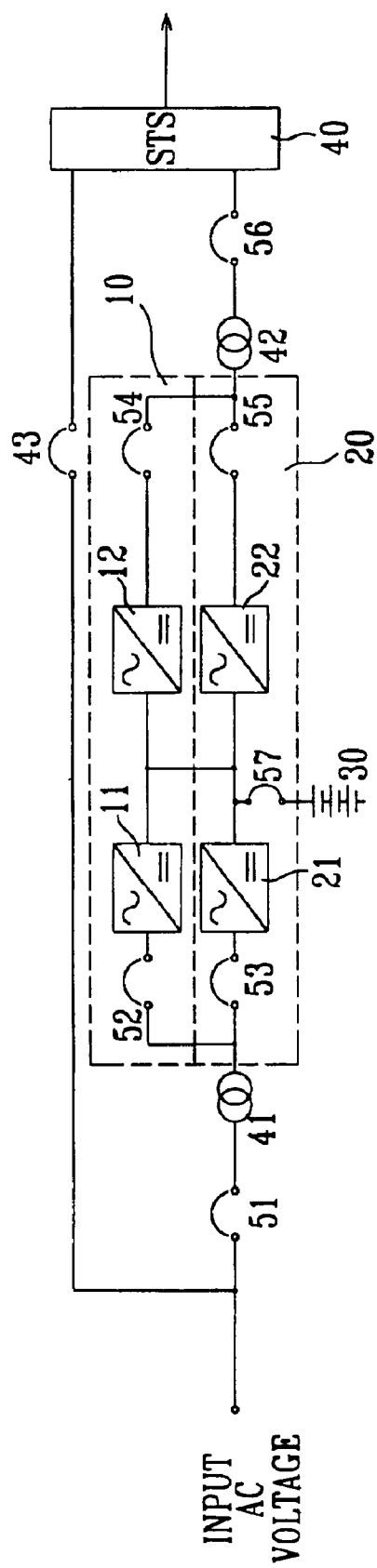
FIG. 1 is a circuit diagram of a first embodiment of an uninterruptible power system in accordance with the present invention.

With reference to FIG. 1 a first embodiment of an uninterruptible power system of the present invention comprises two current conversion units (10)(20) coupled in parallel between an input AC voltage (line voltage) and a load. Each current conversion unit (10)(20) has a rectifier (11)(21) and an inverter (12)(22) connected in series. The output terminal of the rectifier (11) in the first unit (10) is simultaneously connected to the input terminals of the two inverters (12)(22). Similarly, the output terminal of the rectifier (12) in the second unit (10) is also simultaneously connected to the input terminals of the two inverters (12)(22), whereby a cross connecting configuration is formed by the two rectifiers (11)(21) and the two inverters (12)(22). In other words, either of the two inverters (12)(22) is able to operate in company with a selected rectifier (11)(21), and vice versa.

A battery set (30) is coupled to the output terminals of the two rectifiers (11)(21). An input transformer (41) is coupled to the input AC voltage through a switch (51). Moreover, the output of the transformer (41) is coupled to the two rectifiers (11)(21) through two switches (52)(53).

An output transformer (42) is coupled to the output terminals of the two inverters (12)(22).

A static transform switch (STS)(40) has two input terminals, one of which is connected to the input AC voltage through a by-pass switch (43), and the other one is coupled to the output terminal of the output transformer (42) through a switch (56).

When the power system works normally, the two current conversion units (10)(20) share the load current, i.e. the two current conversion units (10)(20) cooperatively provide the operating current to the load. Because the current conversion units (10)(20) are connected to form a cross configuration, even when the malfunction takes place at either of the two inverters (12)(22) of a unit (10)(20), the rectifier (11)(21) of that unit (10)(20) still operates normally and outputs the rectified current to the other workable inverter (12)(22). In another aspect, if either rectifier (11)(21) is faulty, the other one simultaneously outputs the current to the two inverters (11)(21).

Figure 2:
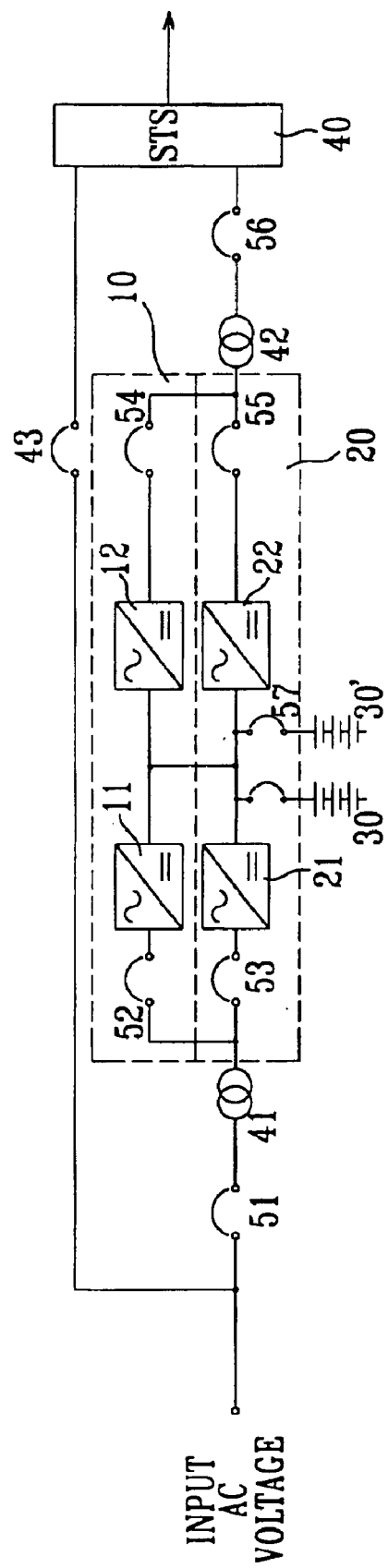
FIG. 2 is a circuit diagram of a second embodiment of an uninterruptible power system in accordance with the present invention.

With reference to FIG. 2, it is noted that the amount of the battery set (30) is alterable depending on requirements of the system so that there are two battery sets (30)(30') applied in the power system.

Figure 3:
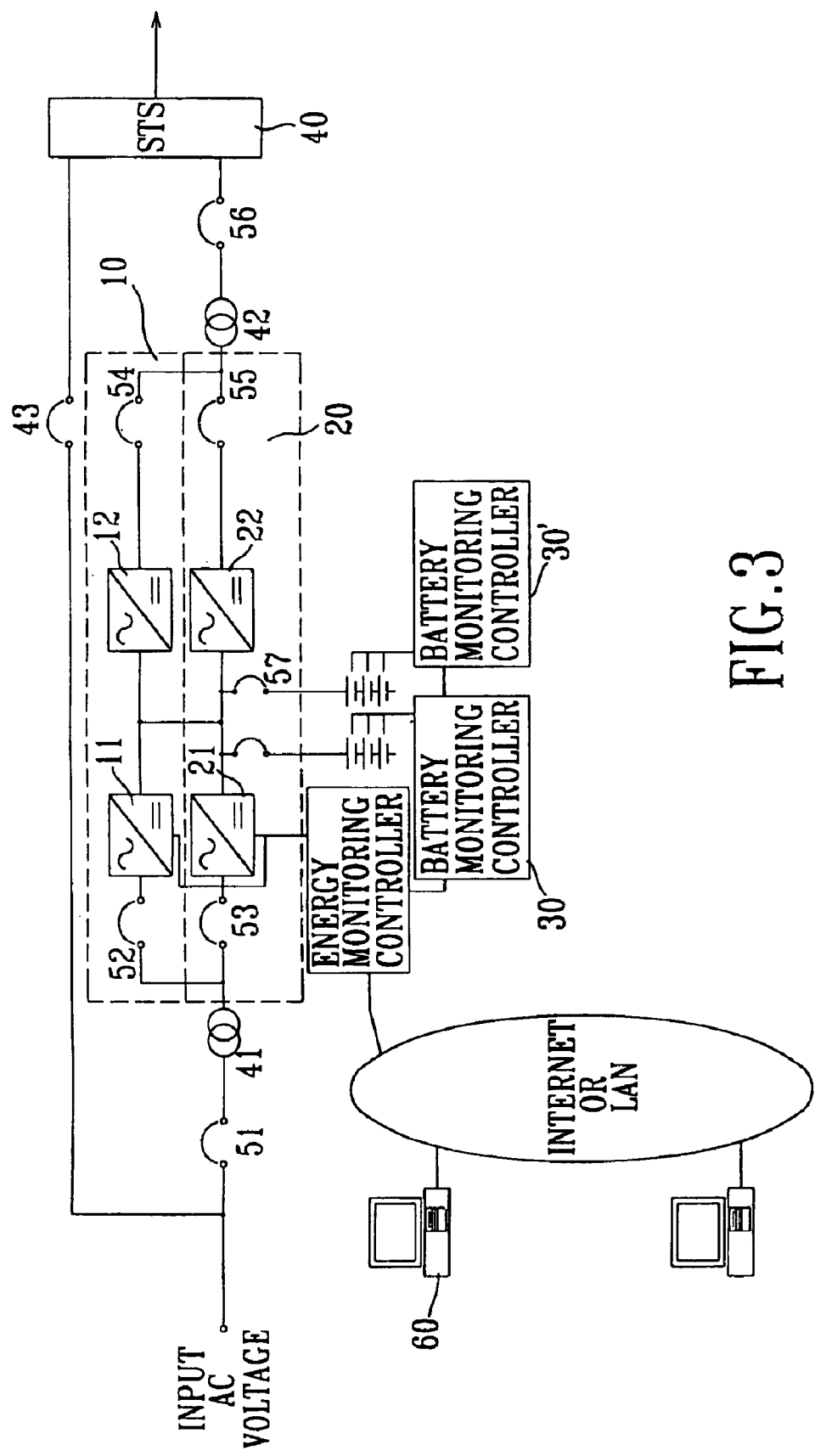
FIG. 3 is a circuit diagram of a third embodiment of an uninterruptible power system in accordance with the present invention.

With reference to FIG. 3, two battery monitoring controllers (30)(30') are both coupled to the output terminals of the two rectifiers (11)(21). In company with an energy monitoring controller (50) and a remote host (60), the battery information measured by the two battery monitoring controllers (30)(30') is transmitted to the energy monitoring controller (50) to estimate the energy storage status. This information can be further provided to the remote host (60) via the Internet or a local area network (LAN).

Figure 4:
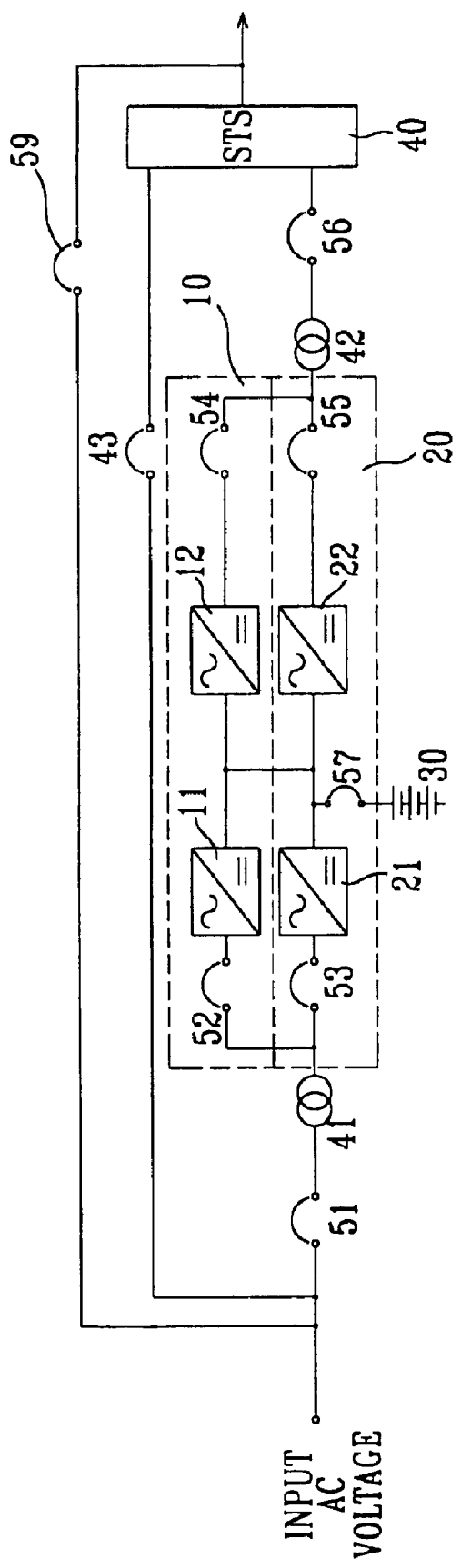
FIG. 4 is a circuit diagram of a fourth embodiment of an uninterruptible power system in accordance with the present invention.
Figure 5:
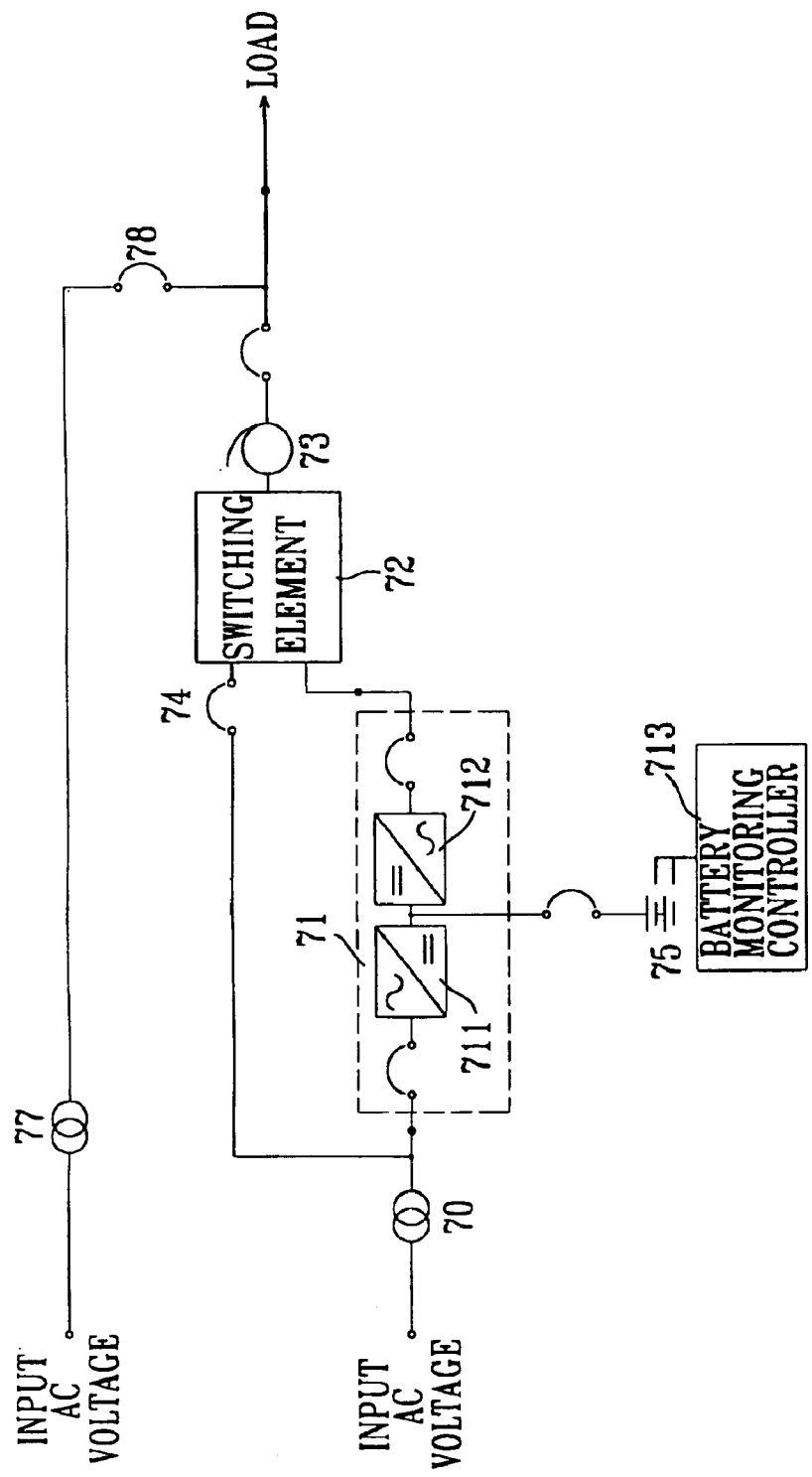
FIG. 5 is a circuit diagram of a conventional power system.
Figure 6:
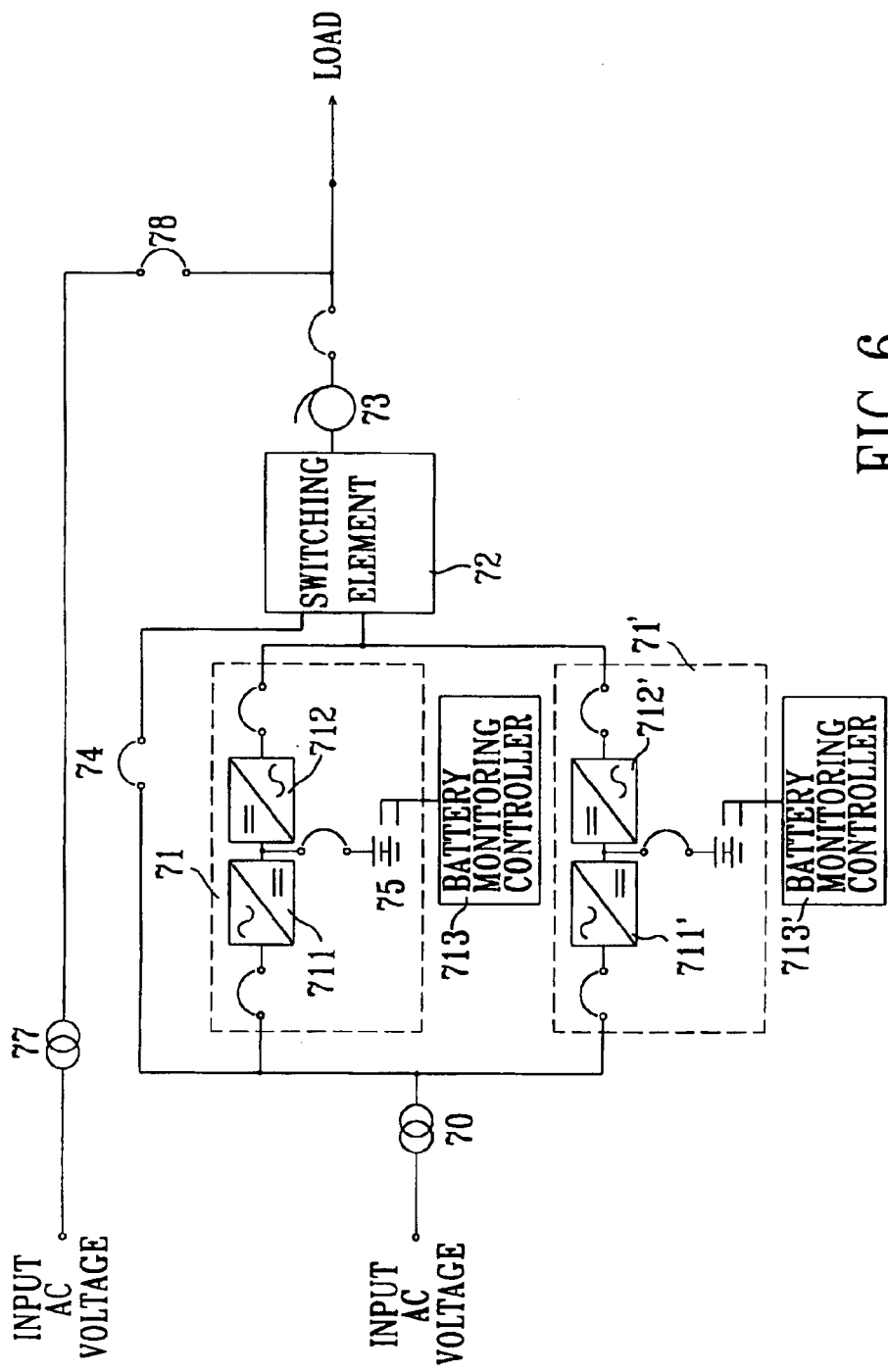
FIG. 6 is a circuit diagram of another conventional power system.

With reference to FIG. 4, an auxiliary by-pass switch (59) is connected between the output of the STS (40) and the input AC voltage, which allows the AC voltage to directly pass to the load while the UPS is completely shut down.

From the foregoing description, it is noted that the feature of the present invention is that when any inverter or rectifier is faulty in one current conversion module, the normal inverter or rectifier in the same module still can be operated in company with the other current conversion module to thus increase the efficiency of the equipment utilization.

It is to be understood, however, that even though numerous characteristics and advantages of the present invention have been set forth in the foregoing description, together with details of the structure and function of the invention, the disclosure is illustrative only, and changes may be made in detail, especially in matter of s arrangement of parts within the principles of the invention to the full extent indicated by the broad general meaning of the terms in which the appended claims are expressed.

What is claimed is:

1. An interruptible power system comprising:
   two current conversion units coupled in parallel between an input AC voltage and a load, wherein each current conversion unit is composed of a rectifier and an inverter both connected in series, wherein the two rectifiers and the two inverters are further connected to form a cross configuration;
   at least one battery set coupled to output terminals of the two rectifiers;
   an input transformer coupled between the input AC voltage and input terminals of the two current conversion units;
   an output transformer coupled to output terminals of the two current conversion units;
   a static transform switch (STS) having two input terminals and one output terminal, wherein one of the two input terminals is coupled to an output terminal of the output transformer and the other input terminal is coupled to the input AC voltage through a by-pass switch, wherein the output terminal of the STS is coupled to the load;
   wherein when either the inverter or the rectifier is faulty in one of said current conversion modules, the other inverter or rectifier in the same module is still operated and controlled by the other current conversion module.

2. The power system as claimed in claim 1, wherein the at least one battery set further connects to a battery monitoring controller.

3. The power system as claimed in claim 2, wherein the battery monitoring controller connects to a remote host through an energy monitoring controller, and thus allowing the remote host to gather energy storage information of said at least one battery set.

4. The power system as claimed in claim 1, a first switch is coupled between the input AC power and the input transformer, two second switches are respectively connected between the input transformer and one respective rectifier, two third switches are respectively connected between one respective inverter and the output transformer, a fourth switch is coupled between the output transformer and the STS, and a fifth switch is connected between the at least one battery set and the two current conversions modules.

5. The power system as claimed in claim 3, a first switch is coupled between the input AC power and the input transformer, two second switches are respectively connected between the input transformer and one respective rectifier, two third switches are respectively connected between one respective inverter and the output transformer, a fourth switch is coupled between the output transformer and the STS, and a fifth switch is connected between the at least one battery set and the two current conversions modules.

6. The power system as claimed in claim 1, an auxiliary by-pass switch is connected between the output of the STS and the input AC voltage.

7. The power system as claimed in claim 3, an auxiliary by-pass switch is connected between the output of the STS and the input AC voltage.

8. The power system as claimed in claim 4, an auxiliary by-pass switch is connected between the output of the STS and the input AC voltage.

9. The power system as claimed in claim 5, an auxiliary by-pass switch is connected between the output of the STS and the input AC voltage.

* * * * *